United States Patent
Kent, IV et al.

(10) Patent No.: US 11,238,036 B2
(45) Date of Patent: *Feb. 1, 2022

(54) SYSTEM PERFORMANCE LOGGING OF COMPLEX REMOTE QUERY PROCESSOR QUERY OPERATIONS

(71) Applicant: Deephaven Data Labs LLC, Plymouth, MN (US)

(72) Inventors: David R. Kent, IV, Colorado Springs, CO (US); Ryan Caudy, New York, NY (US); Charles Wright, Cortlandt Manor, NY (US); Radu Teodorescu, New York, NY (US)

(73) Assignee: Deephaven Data Labs, LLC, Plymouth, MN (US)

( * ) Notice: Subject to any disclaimer, the term of this patent is extended or adjusted under 35 U.S.C. 154(b) by 1171 days.

This patent is subject to a terminal disclaimer.

(21) Appl. No.: 15/709,183

(22) Filed: Sep. 19, 2017

(65) Prior Publication Data

US 2018/0004796 A1    Jan. 4, 2018

Related U.S. Application Data

(63) Continuation of application No. 15/154,980, filed on May 14, 2016, now Pat. No. 9,886,469.
(Continued)

(51) Int. Cl.
*G06F 16/2453* (2019.01)
*G06F 16/23* (2019.01)
(Continued)

(52) U.S. Cl.
CPC ........ *G06F 16/2453* (2019.01); *G06F 3/0481* (2013.01); *G06F 3/0482* (2013.01);
(Continued)

(58) Field of Classification Search
CPC .. G06F 16/2358; G06F 3/0481; G06F 3/0482; G06F 3/04847; G06F 3/0485; G06F 3/04895; G06F 3/0605; G06F 3/0656; G06F 3/067; G06F 8/30; G06F 8/41; G06F 8/427; G06F 8/60; G06F 11/1451;
(Continued)

(56) References Cited

U.S. PATENT DOCUMENTS 5,335,202 A    8/1994  Manning et al.
5,452,434 A    9/1995  Macdonald
(Continued)

FOREIGN PATENT DOCUMENTS

CA    2309462 A1    12/2000
EP    1406463 A2    4/2004
(Continued)

OTHER PUBLICATIONS

Non-Final Office Action dated Sep. 22, 2016, in U.S. Appl. No. 15/154,987.
(Continued)

*Primary Examiner* — Apu M Mofiz
*Assistant Examiner* — Dara J Glasser
(74) *Attorney, Agent, or Firm* — Carmichael IP, PLLC

(57) ABSTRACT

Described are methods, systems and computer readable media for performance logging of complex query operations.

13 Claims, 13 Drawing Sheets

Related U.S. Application Data

(60) Provisional application No. 62/161,813, filed on May 14, 2015.

(51) Int. Cl.

| | | |
|---|---|---|
| *G06F 16/22* | (2019.01) | |
| *G06F 16/27* | (2019.01) | |
| *G06F 16/16* | (2019.01) | |
| *G06F 16/215* | (2019.01) | |
| *G06F 16/245* | (2019.01) | |
| *G06F 16/248* | (2019.01) | |
| *G06F 16/25* | (2019.01) | |
| *G06F 16/28* | (2019.01) | |
| *G06F 16/907* | (2019.01) | |
| *G06F 16/951* | (2019.01) | |
| *G06F 16/242* | (2019.01) | |
| *G06F 16/2455* | (2019.01) | |
| *G06F 16/2457* | (2019.01) | |
| *G06F 16/901* | (2019.01) | |
| *G06F 16/9535* | (2019.01) | |
| *G06F 16/955* | (2019.01) | |
| *G06F 16/957* | (2019.01) | |
| *G06F 21/00* | (2013.01) | |
| *G06F 21/62* | (2013.01) | |
| *G06F 40/18* | (2020.01) | |
| *G06F 40/134* | (2020.01) | |
| *G06F 40/166* | (2020.01) | |
| *G06F 40/177* | (2020.01) | |
| *G06F 40/216* | (2020.01) | |
| *G06F 40/274* | (2020.01) | |
| *G06F 40/117* | (2020.01) | |
| *G06F 40/183* | (2020.01) | |
| *G06F 40/174* | (2020.01) | |
| *G06F 3/0482* | (2013.01) | |
| *G06F 3/0489* | (2013.01) | |
| *G06F 12/084* | (2016.01) | |
| *H04L 12/58* | (2006.01) | |
| *G06F 15/173* | (2006.01) | |
| *G06F 3/0481* | (2013.01) | |
| *G06F 3/0484* | (2013.01) | |
| *G06F 3/0485* | (2013.01) | |
| *G06F 12/02* | (2006.01) | |
| *G06F 8/30* | (2018.01) | |
| *G06F 8/41* | (2018.01) | |
| *H04L 29/08* | (2006.01) | |
| *G06F 3/06* | (2006.01) | |
| *G06F 11/14* | (2006.01) | |
| *H04L 29/06* | (2006.01) | |
| *G06F 8/60* | (2018.01) | |
| *H04L 12/18* | (2006.01) | |
| *H04L 29/12* | (2006.01) | |
| *G06F 12/14* | (2006.01) | |
| *G06F 3/0483* | (2013.01) | |
| *G06F 16/14* | (2019.01) | |
| *G06F 16/11* | (2019.01) | |
| *G06F 17/40* | (2006.01) | |
| *G06Q 40/04* | (2012.01) | |

(52) U.S. Cl.
CPC .......... *G06F 3/0483* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01); *G06F 16/113* (2019.01); *G06F 16/144* (2019.01); *G06F 16/162* (2019.01); *G06F 16/215* (2019.01); *G06F 16/22* (2019.01); *G06F 16/221* (2019.01); *G06F 16/2228* (2019.01); *G06F 16/2237* (2019.01); *G06F 16/2246* (2019.01); *G06F 16/2255* (2019.01); *G06F 16/2264* (2019.01); *G06F 16/2272* (2019.01); *G06F 16/2282* (2019.01); *G06F 16/23* (2019.01); *G06F 16/2308* (2019.01); *G06F 16/2358* (2019.01); *G06F 16/2365* (2019.01); *G06F 16/2372* (2019.01); *G06F 16/2379* (2019.01); *G06F 16/242* (2019.01); *G06F 16/245* (2019.01); *G06F 16/248* (2019.01); *G06F 16/2428* (2019.01); *G06F 16/2455* (2019.01); *G06F 16/2456* (2019.01); *G06F 16/2457* (2019.01); *G06F 16/24534* (2019.01); *G06F 16/24535* (2019.01); *G06F 16/24537* (2019.01); *G06F 16/24539* (2019.01); *G06F 16/24553* (2019.01); *G06F 16/24561* (2019.01); *G06F 16/24575* (2019.01); *G06F 16/254* (2019.01); *G06F 16/27* (2019.01); *G06F 16/278* (2019.01); *G06F 16/285* (2019.01); *G06F 16/907* (2019.01); *G06F 16/9024* (2019.01); *G06F 16/951* (2019.01); *G06F 16/9535* (2019.01); *G06F 16/9566* (2019.01); *G06F 16/9574* (2019.01); *G06F 21/00* (2013.01); *G06F 21/6209* (2013.01); *G06F 40/117* (2020.01); *G06F 40/134* (2020.01); *G06F 40/166* (2020.01); *G06F 40/174* (2020.01); *G06F 40/177* (2020.01); *G06F 40/18* (2020.01); *G06F 40/183* (2020.01); *G06F 40/216* (2020.01); *G06F 40/274* (2020.01); *H04L 12/18* (2013.01); *H04L 51/046* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/141* (2013.01); *H04L 67/28* (2013.01); *H04L 67/2833* (2013.01); *H04L 67/2842* (2013.01); *H04L 67/34* (2013.01); *H04L 67/42* (2013.01); *H04L 69/16* (2013.01); *G06F 16/2291* (2019.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *G06Q 40/04* (2013.01); *H04L 67/2847* (2013.01)

(58) Field of Classification Search
CPC ............ G06F 11/1464; G06F 11/1469; G06F 12/0261; G06F 12/084; G06F 15/17331; G06F 2201/805; G06F 2201/84; G06F 2212/60; H04L 12/18; H04L 51/12; H04L 61/2069; H04L 63/101; H04L 63/102; H04L 67/1002; H04L 67/34; H04L 67/42; H04L 69/16

See application file for complete search history.

(56) References Cited

U.S. PATENT DOCUMENTS 5,469,567 A 11/1995 Okada
5,504,885 A 4/1996 Alashqur

(56) References Cited

U.S. PATENT DOCUMENTS

| | | | |
|---|---|---|---|
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,411 A | 7/1998 | Groff et al. |
| 5,787,428 A | 7/1998 | Hart |
| 5,806,059 A | 9/1998 | Tsuchida et al. |
| 5,808,911 A | 9/1998 | Tucker et al. |
| 5,859,972 A | 1/1999 | Subramaniam et al. |
| 5,873,075 A | 2/1999 | Cochrane et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,026,390 A * | 2/2000 | Ross ................. G06F 16/2393 |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,160,548 A | 12/2000 | Lea et al. |
| 6,253,195 B1 | 6/2001 | Hudis et al. |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,397,206 B1 | 5/2002 | Hill et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,519,604 B1 | 2/2003 | Acharya et al. |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,801,908 B1 | 10/2004 | Fuloria et al. |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B1 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,047,484 B1 | 5/2006 | Becker et al. |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 | 8/2006 | Cudd et al. |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,523,462 B1 | 4/2009 | Nesamoney et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,596,550 B2 | 9/2009 | Mordvinov et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,711,788 B2 | 5/2010 | Ran et al. |
| 7,747,640 B2 | 6/2010 | Dettinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |

(56) References Cited

U.S. PATENT DOCUMENTS

| | | |
|---|---|---|
| 7,882,121 B2 | 2/2011 | Bruno et al. |
| 7,882,132 B2 | 2/2011 | Ghatare |
| 7,895,191 B2 | 2/2011 | Colossi et al. |
| 7,904,487 B2 | 2/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Vang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,623 B2 | 5/2012 | Lendermann et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,621,424 B2 | 12/2013 | Kejariwal et al. |
| 8,631,034 B1 | 1/2014 | Peloski |
| 8,635,251 B1 | 1/2014 | Chan |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,775,412 B2 | 7/2014 | Day et al. |
| 8,788,254 B2 | 7/2014 | Peloski |
| 8,793,243 B2 | 7/2014 | Weyerhaeuser et al. |
| 8,805,875 B1 | 8/2014 | Bawcom et al. |
| 8,805,947 B2 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,177,079 B1 | 11/2015 | Ramachandran et al. |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 9,477,702 B1 | 10/2016 | Ramachandran et al. |
| 9,563,486 B1 * | 2/2017 | Narsude ................ G06F 9/541 |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent, I et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,847,917 B2 | 12/2017 | Varney et al. |
| 9,852,231 B1 | 12/2017 | Ravi et al. |
| 9,886,469 B2 | 2/2018 | Kent, I et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent, I et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 10,521,449 B1 | 12/2019 | Schwartz et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0004964 A1 | 1/2003 | Cameron et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0115212 A1 | 6/2003 | Hornibrook et al. |
| 2003/0167261 A1 | 9/2003 | Grust et al. |
| 2003/0177139 A1 | 9/2003 | Cameron et al. |
| 2003/0182261 A1 | 9/2003 | Patterson |
| 2003/0187744 A1 | 10/2003 | Goodridge |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0015566 A1 | 1/2004 | Anderson et al. |
| 2004/0076155 A1 | 4/2004 | Yajnik et al. |
| 2004/0090472 A1 | 5/2004 | Risch et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0205048 A1 | 10/2004 | Pizzo et al. |
| 2004/0216150 A1 | 10/2004 | Scheitler et al. |
| 2004/0220923 A1 | 11/2004 | Nica |
| 2004/0254876 A1 | 12/2004 | Coval et al. |
| 2004/0267824 A1 | 12/2004 | Pizzo et al. |
| 2005/0015490 A1 | 1/2005 | Saare et al. |
| 2005/0060693 A1 | 3/2005 | Robison et al. |
| 2005/0097447 A1 | 5/2005 | Serra et al. |

(56) References Cited

U.S. PATENT DOCUMENTS

| | | |
|---|---|---|
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0144189 A1 | 6/2005 | Edwards et al. |
| 2005/0165866 A1 | 7/2005 | Bohannon et al. |
| 2005/0198001 A1 | 9/2005 | Cunningham et al. |
| 2005/0228828 A1 | 10/2005 | Chandrasekar et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0123024 A1 | 6/2006 | Sathyanarayan et al. |
| 2006/0131383 A1 | 6/2006 | Battagin et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhur et al. |
| 2006/0218200 A1 | 9/2006 | Factor et al. |
| 2006/0230016 A1 | 10/2006 | Cunningham et al. |
| 2006/0235786 A1 | 10/2006 | DiSalvo |
| 2006/0253311 A1 | 11/2006 | Yin et al. |
| 2006/0271510 A1 | 11/2006 | Harward et al. |
| 2006/0277162 A1 | 12/2006 | Smith |
| 2006/0277319 A1 | 12/2006 | Elien et al. |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0113014 A1 | 5/2007 | Manolov et al. |
| 2007/0116287 A1 | 5/2007 | Rasizade et al. |
| 2007/0118619 A1 | 5/2007 | Schwesig et al. |
| 2007/0169003 A1 | 7/2007 | Branda et al. |
| 2007/0198479 A1 | 8/2007 | Cai et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0294217 A1 | 12/2007 | Chen et al. |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0097748 A1 | 4/2008 | Haley et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0172639 A1 | 7/2008 | Keysar et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0037500 A1 | 2/2009 | Kirshenbaum |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0157723 A1* | 6/2009 | De Peuter ............. G06Q 10/10 |
| 2009/0248618 A1 | 10/2009 | Carlson et al. |
| 2009/0248902 A1 | 10/2009 | Blue |
| 2009/0254516 A1 | 10/2009 | Meiyyappan et al. |
| 2009/0271472 A1 | 10/2009 | Scheitler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0023952 A1 | 1/2010 | Sandoval et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0057835 A1 | 3/2010 | Little |
| 2010/0070721 A1 | 3/2010 | Pugh et al. |
| 2010/0114890 A1 | 5/2010 | Hagar et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2010/0293334 A1 | 11/2010 | Xun et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0231389 A1 | 9/2011 | Surna et al. |
| 2011/0314019 A1 | 12/2011 | Peris |
| 2012/0005238 A1 | 1/2012 | Jebara et al. |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0191582 A1 | 7/2012 | Rance et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0246094 A1 | 9/2012 | Hsu et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166551 A1 | 6/2013 | Wong et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0026121 A1 | 1/2014 | Jackson et al. |
| 2014/0040203 A1 | 2/2014 | Lu et al. |
| 2014/0046638 A1 | 2/2014 | Peloski |
| 2014/0059646 A1 | 2/2014 | Hannel et al. |
| 2014/0082470 A1 | 3/2014 | Trebas et al. |
| 2014/0082724 A1 | 3/2014 | Pearson et al. |
| 2014/0095365 A1 | 4/2014 | Potekhina et al. |
| 2014/0136521 A1 | 5/2014 | Pappas |
| 2014/0143123 A1 | 5/2014 | Banke et al. |
| 2014/0149947 A1 | 5/2014 | Blyumen |
| 2014/0149997 A1 | 5/2014 | Kukreja et al. |
| 2014/0156618 A1 | 6/2014 | Castellano |
| 2014/0156632 A1 | 6/2014 | Yu et al. |
| 2014/0173023 A1 | 6/2014 | Varney et al. |
| 2014/0181036 A1 | 6/2014 | Dhamankar et al. |

(56) References Cited

U.S. PATENT DOCUMENTS

| | | |
|---|---|---|
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0289700 A1 | 9/2014 | Srinivasaraghavan et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0321280 A1 | 10/2014 | Evans |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0358892 A1 | 12/2014 | Nizami et al. |
| 2014/0359574 A1 | 12/2014 | Beckwith et al. |
| 2014/0369550 A1 | 12/2014 | Davis et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0032789 A1 | 1/2015 | Nguyen et al. |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2015/0356157 A1 | 12/2015 | Anderson et al. |
| 2016/0026383 A1 | 1/2016 | Lee et al. |
| 2016/0026442 A1 | 1/2016 | Chhaparia |
| 2016/0026684 A1 | 1/2016 | Mukherjee et al. |
| 2016/0065670 A1 | 3/2016 | Kimmel et al. |
| 2016/0085772 A1 | 3/2016 | Vermeulen et al. |
| 2016/0092599 A1 | 3/2016 | Barsness et al. |
| 2016/0103897 A1 | 4/2016 | Nysewander et al. |
| 2016/0125018 A1 | 5/2016 | Tomoda et al. |
| 2016/0147748 A1 | 5/2016 | Florendo et al. |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0032016 A1 | 2/2017 | Zinner et al. |
| 2017/0161514 A1 | 6/2017 | Dettinger et al. |
| 2017/0177677 A1 | 6/2017 | Wright et al. |
| 2017/0185385 A1 | 6/2017 | Kent, I et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0329740 A1 | 11/2017 | Crawford et al. |
| 2017/0357708 A1 | 12/2017 | Ramachandran et al. |
| 2017/0359415 A1 | 12/2017 | Venkatraman et al. |
| 2018/0011891 A1 | 1/2018 | Wright et al. |
| 2018/0052879 A1 | 2/2018 | Wright |
| 2018/0137175 A1 | 5/2018 | Teodorescu et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| GB | 2397906 A | 8/2004 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |
| WO | 2016183563 A1 | 11/2016 |

OTHER PUBLICATIONS

Non-Final Office Action dated Sep. 26, 2016, in U.S. Appl. No. 15/155,005.
Non-Final Office Action dated Sep. 29, 2016, in U.S. Appl. No. 15/154,990.
Non-Final Office Action dated Sep. 8, 2016, in U.S. Appl. No. 15/154,975.
Non-Final Office Action dated Sep. 9, 2016, in U.S. Appl. No. 15/154,996.
Non-Final Office Action dated Sep. 9, 2016, in U.S. Appl. No. 15/155,010.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated Nov. 17, 2016, in U.S. Appl. No. 15/154,991.
Notice of Allowance dated Nov. 17, 2017, in U.S. Appl. No. 15/154,993.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.

(56) References Cited

OTHER PUBLICATIONS

Notice of Allowance dated Oct. 21, 2016, in U.S. Appl. No. 15/154,999.
Notice of Allowance dated Oct. 6, 2017, in U.S. Appl. No. 15/610,162.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Google Protocol RPC Library Overview", dated Apr. 27, 2016. Retrieved from https://cloud.google.com/appengine/docs/python/tools/protorpc/ (last accessed Jun. 16, 2016).
"IBM—What is HBase?", dated Sep. 6, 2015. Retrieved from https://web.archive.org/web/20150906022050/http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere Biginsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.

"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retrieved from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Advisory Action dated Apr. 20, 2017, in U.S. Appl. No. 15/154,980.
Advisory Action dated Apr. 6, 2017, in U.S. Appl. No. 15/154,995.
Advisory Action dated May 3, 2017, in U.S. Appl. No. 15/154,993.
Borror, Jefferey A. "Q for Mortals 2.0", dated Nov. 1, 2011. Retreived from http://code.kx.com/wiki/JB:QforMortals2/contents.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request mailed Nov. 20, 2017, in U.S. Appl. No. 15/154,997.
Ex Parte Quayle Action mailed Aug. 8, 2016, in U.S. Appl. No. 15/154,999.
Final Office Action dated Apr. 10, 2017, in U.S. Appl. No. 15/155,006.
Final Office Action dated Dec. 19, 2016, in U.S. Appl. No. 15/154,995.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jul. 27, 2017, in U.S. Appl. No. 15/154,993.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Gai, Lei et al. "An Efficient Summary Graph Driven Method for RDF Query Processing", dated Oct. 27, 2015. Retrieved from http://arxiv.org/pdf/1510.07749.pdf.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.

(56) References Cited

OTHER PUBLICATIONS

International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science.
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-Final Office Action dated Apr. 19, 2017, in U.S. Appl. No. 15/154,974.
Non-Final Office Action dated Aug. 12, 2016, in U.S. Appl. No. 15/155,001.
Non-Final Office Action dated Aug. 14, 2017, in U.S. Appl. No. 15/464,314.
Non-Final Office Action dated Aug. 16, 2016, in U.S. Appl. No. 15/154,993.
Non-Final Office Action dated Aug. 19, 2016, in U.S. Appl. No. 15/154,991.
Non-Final Office Action dated Aug. 25, 2016, in U.S. Appl. No. 15/154,980.
Non-Final Office Action dated Aug. 26, 2016, in U.S. Appl. No. 15/154,995.
Non-Final Office Action dated Aug. 8, 2016, in U.S. Appl. No. 15/154,983.
Non-Final Office Action dated Dec. 13, 2017, in U.S. Appl. No. 15/608,963.
Non-Final Office Action dated Feb. 8, 2017, in U.S. Appl. No. 15/154,997.
Non-Final Office Action dated Jul. 27, 2017, in U.S. Appl. No. 15/154,995.
Non-Final Office Action dated Mar. 2, 2017, in U.S. Appl. No. 15/154,984.
Non-Final Office Action dated Nov. 15, 2017, in U.S. Appl. No. 15/654,461.
Non-Final Office Action dated Nov. 17, 2016, in U.S. Appl. No. 15/154,999.
Non-Final Office Action dated Nov. 21, 2017, in U.S. Appl. No. 15/155,005.
Non-Final Office Action dated Nov. 30, 2017, in U.S. Appl. No. 15/155,012.
Non-Final Office Action dated Oct. 13, 2016, in U.S. Appl. No. 15/155,009.
Non-Final Office Action dated Oct. 27, 2016, in U.S. Appl. No. 15/155,006.
Non-Final Office Action dated Oct. 5, 2017, in U.S. Appl. No. 15/428,145.
Non-Final Office Action dated Oct. 7, 2016, in U.S. Appl. No. 15/154,998.
Non-Final Office Action dated Sep. 1, 2016, in U.S. Appl. No. 15/154,979.
Non-Final Office Action dated Sep. 1, 2016, in U.S. Appl. No. 15/155,011.
Non-Final Office Action dated Sep. 1, 2016, in U.S. Appl. No. 15/155,012.
Non-Final Office Action dated Sep. 14, 2016, in U.S. Appl. No. 15/154,984.
Non-Final Office Action dated Sep. 16, 2016, in U.S. Appl. No. 15/154,988.
Hartle, Thom, Conditional Formatting in Excel using CQG's RTD Bate Function (2011), http://news.cqg.com/blogs/exce/l2011/05/conditional-formatting-excel-using-cqgs-rtd-bate function (last visited Apr. 3, 2019).

(56) References Cited

OTHER PUBLICATIONS

Maria Azbel, How to hide and group columns in Excel AbleBits (2014), https://www.ablebits.com/office-addins-blog/2014/08/06/excel-hide-columns/ (last visited Jan. 18, 2019).
Mark Dodge & Craig Stinson, Microsoft Excel 2010 inside out (2011).
Posey, Brien, "How to Combine PowerShell Cmdlets", Jun. 14, 2013 Redmond the Independent Voice of the Microsoft Community (Year: 2013).
Svetlana Cheusheve, Excel formulas for conditional formatting based on another cell AbleBits (2014), https://www.ablebits.com/office-addins-blog/2014/06/10/excel-conditional-formatting-formulas/comment-page-6/(last visited Jan. 14, 2019).
Advisory Action dated Dec. 21, 2017, in U.S. Appl. No. 15/154,984.
Breitbart, Update Propagation Protocols for Replicated Databases, SIGMOD '99 Philadelphia PA, 1999, pp. 97-108.
Final Office Action dated Aug. 10, 2018, in U.S. Appl. No. 15/796,230.
Final Office Action dated Aug. 2, 2018, in U.S. Appl. No. 15/154,996.
Final Office Action dated Aug. 28, 2018, in U.S. Appl. No. 15/813,119.
Final Office Action dated Dec. 29, 2017, in U.S. Appl. No. 15/154,974.
Final Office Action dated Jun. 18, 2018, in U.S. Appl. No. 15/155,005.
Final Office Action dated May 18, 2018, in U.S. Appl. No. 15/654,461.
Kramer, The Combining DAG: A Technique for Parallel Data Flow Analysis, IEEE Transactions on Parallel and Distributed Systems, vol. 5, No. 8, Aug. 1994, pp. 805-813.
Non-Final Office Action dated Apr. 12, 2018, in U.S. Appl. No. 15/154,997.
Non-Final Office Action dated Apr. 23, 2018, in U.S. Appl. No. 15/813,127.
Non-Final Office Action dated Apr. 5, 2018, in U.S. Appl. No. 15/154,984.
Non-Final Office Action dated Aug. 10, 2018, in U.S. Appl. No. 16/004,578.
Non-Final Office Action dated Dec. 28, 2017, in U.S. Appl. No. 15/154,996.
Non-Final Office Action dated Dec. 28, 2017, in U.S. Appl. No. 15/796,230.
Non-Final Office Action dated Feb. 12, 2018, in U.S. Appl. No. 15/466,836.
Non-Final Office Action dated Feb. 15, 2018, in U.S. Appl. No. 15/813,112.
Non-Final Office Action dated Feb. 28, 2018, in U.S. Appl. No. 15/813,119.
Non-Final Office Action dated Jan. 4, 2018, in U.S. Appl. No. 15/583,777.
Non-Final Office Action dated Jun. 29, 2018, in U.S. Appl. No. 15/154,974.
Non-Final Office Action dated Jun. 8, 2018, in U.S. Appl. No. 15/452,574.
Non-Final Office Action dated Mar. 20, 2018, in U.S. Appl. No. 15/155,006.
Notice of Allowance dated Apr. 30, 2018, in U.S. Appl. No. 15/155,012.
Notice of Allowance dated Feb. 12, 2018, in U.S. Appl. No. 15/813,142.
Notice of Allowance dated Feb. 26, 2018, in U.S. Appl. No. 15/428,145.
Notice of Allowance dated Jul. 11, 2018, in U.S. Appl. No. 15/154,995.
Notice of Allowance dated Mar. 1, 2018, in U.S. Appl. No. 15/464,314.
Notice of Allowance dated May 4, 2018, in U.S. Appl. No. 15/897,547.
Notice of Allowance dated Sep. 11, 2018, in U.S. Appl. No. 15/608,963.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
"Definition of Multicast" by Lexico powered by Oxford at https://www.lexico.com/en/definition/multicast, 2019, p. 1.
"What is a Key-Value Database?" at https://database.guide/what-is-a-key-value-database, Database Concepts, NOSQL, 2019 Database.guide, Jun. 21, 2016, pp. 1-7.
Notice of Allowance dated Apr. 19, 2017, in U.S. Appl. No. 15/154,999.
Advisory Action dated Mar. 31, 2017, in U.S. Appl. No. 15/154,996.
Non-final Office Action dated Aug. 8, 2016, in U.S. Appl. No. 15/154,985.

* cited by examiner

800 Top level query log representation

| Date 802 | Query ID 804 | StartTime 808 | EndTime 810 | ... | Duration 814 |
|---|---|---|---|---|---|
| 3/2/16 | 1004 | 2016-03-02T12:25:42.656000000 NY | 2016-03-02T12:25:43.268852163 NY | ... | 47 |
| 3/2/16 | 1005 | 2016-03-02T12:25:43.351000000 NY | 2016-03-02T12:25:45.296031421 NY | ... | 187 |
| 3/2/16 | 1006 | 2016-03-02T12:25:45.342000000 NY | 2016-03-02T12:25:45.349185041 NY | ... | 47 |
| ... | ... | ... | ... | ... | ... |

FIG. 8

900 Query Operation Log Representation

| Parent Query ID 902 | Operation Number 904 | Description 906 | Input Size 908 | ... | Subtask Duration 910 |
|---|---|---|---|---|---|
| 1004 | 1 | where([Date in [`2016-03-02`]]) | 535 | ... | 488050 |
| 1004 | 2 | sort([USym]) | 84125 | ... | 158123 |
| 1004 | 1 | selectDistinct([XYZ]) | 83992 | ... | 276745 |
| ... | ... | ... | ... | ... | ... |

FIG. 9

950 Update Performance Log Representation

| Interval Start Time 952 | Collection Interval 954 | Entry ID 956 | ... | Entry Description 958 | Execution Time (ms) 960 |
|---|---|---|---|---|---|
| 12/21/2015 14:51:00 | 12/21/2015 14:52:00 | 100001 | ... | Sort (sym) | 109 |
| 12/21/2015 14:51:00 | 12/21/2015 14:52:00 | 100003 | ... | Where (Date=2015-03-02) | 19 |
| 12/21/2015 14:51:00 | 12/21/2015 14:52:00 | 100007 | ... | LastBy (x) | 29 |
| | ... | ... | ... | ... | |

FIG. 9A

SYSTEM PERFORMANCE LOGGING OF COMPLEX REMOTE QUERY PROCESSOR QUERY OPERATIONS

This application claims the benefit of U.S. Provisional Application No. 62/161,813, entitled "Computer Data System" and filed on May 14, 2015, which is incorporated herein by reference in its entirety.

Embodiments relate generally to computer database systems and computer networks, and more particularly, to methods, systems and computer readable media for logging query performance data, query sub-task performance data, and query interval performance data.

A need may exist for providing complex query systems with a means to measure query-related performance data. Some query-based systems may not offer a means to provide for logging total query performance data and for performance logging of updates to the dynamic components of a reoccurring query operation. Without the performance logging of updates to the reoccurring dynamic portions of the query operation, specific bottlenecks, trends, and issues attributable to a specific dynamic portion of a query operation may not be ascertainable.

Embodiments were conceived in light of the above mentioned needs, problems and/or limitations, among other things.

Some implementations can include a system for improving performance of a remote query computer system by using dynamic query performance logging to identify and remediate dataflow bottlenecks in the remote query computer system, the system comprising one or more processors, computer readable storage coupled to the one or more processors, the computer readable storage having stored thereon instructions that, when executed by the one or more processors, cause the one or more processors to perform operations. The operations can include receiving at a remote query processor on a query server computer a digital request for a remote query processor from a client computer. The operations can also include at the query server computer performing operations. The operations can include receiving a digital request from the client computer to execute a query task, executing the query task, generating a set of query task data, generating a set of query subtask data, collecting the set of query task data, digitally transmitting the set of query task data to one or more performance table loggers. The operations can further include collecting the set of query subtask data. The operations can also include transmitting the set of query subtask data to one or more performance table logger processes. The operations can further include the one or more performance table logger processes writing the set of query task data to a first set of electronic data systems for subsequent retrieval and analysis. The operations can include the one or more performance table logger processes writing the set of query subtask data to a second set of electronic data systems for subsequent retrieval and analysis with a processor retrieving the set of query task data and the set of query subtask data using a performance-enhancing processor to analyze the retrieved set of query task data and the retrieved set of query subtask data to obtain an analysis result with the performance-enhancing processor, identifying based on the analysis result an efficiency impediment in the query server computer using a processor to make changes to the stored instructions and thereby alleviate the identified efficiency impediment and improve efficiency of the remote query computer system wherein the efficiency impediment is one or more of a dataflow bottleneck, excessive use of processor resources, or excessive use of RAM.

The operations can also include configuring a query update interval, executing a query update within the query update interval, generating a set of query update data, collecting the set of query update data and writing the set of query update data to a third set of data systems for subsequent retrieval and analysis.

The operations can further include configuring a query update interval, executing a query update, determining that the query update may not complete within the query update interval, extending the query update interval to allow a full execution of the query update, generating a set of query update data, collecting the set of query update data and writing the set of query update data to a third set of data systems.

The operation can include the query task data including an initial data from one or more nodes an update propagation graph.

The operation can also include at least one of an instance of a class implementing a remote query interface, a remote method invocation on a table handle object, and a script or line of scripting code to be evaluated by an interpreter on a remote query processor.

The operation can further include generating a set of query update data that includes listening for an update to one or more dynamic nodes of an update propagation graph, determining an occurrence of an update to one or more nodes of the update propagation graph, creating data for each occurrence of an update to one or more nodes of the update propagation graph.

The operations can include where the first set of data systems for subsequent retrieval and analysis and the second set of data systems for subsequent retrieval and analysis include at least one of database tables and objects, and where the query task data includes performance data.

Some implementations can include a method comprising executing a query task. The method can also include generating a set of query task data. The method can further include generating a set of query subtask data. The method can include collecting the set of query task data. The method can also include collecting the set of query subtask data. The method can also include writing the set of query task data to a first set of data systems for subsequent retrieval and analysis. The method can further include writing the set of query subtask data to a second set of data systems for subsequent retrieval and analysis.

The method can further include configuring a query update interval. The method can include executing a query update within the query update interval. The method can also include generating a set of query update data. The method can include collecting the set of query update data. The method can also include writing the set of query update data to a third set of data systems for subsequent retrieval and analysis.

The method can include configuring a query update interval. The method can further include executing a query update. The method can include determining that the query update may not complete within the query update interval. The method can include extending the query update interval to allow a full execution of the query update. The method can also include generating a set of query update data. The method can further include collecting the set of query update data. The method can include writing the set of query update data to a third set of data systems.

The method can include wherein the first set of query task data includes an initial data from one or more nodes of an update propagation graph.

The method can further include where a query task includes at least one of an instance of a class implementing a remote query interface; a remote method invocation on a table handle object; and a script or line of scripting code to be evaluated by an interpreter on a remote query processor.

The method can include wherein generating a set of query update data includes listening for an update to one or more dynamic nodes of an update propagation graph. The method can also include determining an occurrence of an update to one or more nodes of the update propagation graph. The method can further include creating data for each occurrence of an update to one or more nodes of the update propagation graph.

The method can include where first set of data systems for subsequent retrieval and analysis and the second set of data systems for subsequent retrieval and analysis include at least one of database tables and objects. The method can also include where the query task data includes performance data.

Some implementations can include a nontransitory computer readable medium having stored thereon software instructions that, when executed by one or more processors, cause the one or more processors to perform operations including receiving a digital request from a client computer to execute a query task. The operations can include executing the query task. The operations can also include generating a set of query task data. The operations can include generating a set of query subtask data. The operations can further include collecting the set of query task data. The operations can include digitally transmitting the set of query task data to one or more performance table loggers. The operations can include collecting the set of query subtask data. The operations can further include transmitting the set of query subtask data to one or more performance table logger processes. The operations can include the one or more performance table logger processes writing the set of query task data to a first set of electronic data systems for subsequent retrieval and analysis. The operations can also include the one or more performance table logger processes writing the set of query subtask data to a second set of electronic data systems for subsequent retrieval and analysis. The operation can further include retrieving the set of query task data and the set of query subtask data. The operation can include analyzing the retrieved set of query task data and the retrieved set of query subtask data to obtain an analysis result. The operation can also include identifying based on the analysis result an efficiency impediment in a query server computer system. The operation can further include making changes to the stored instructions and thereby alleviating the identified efficiency impediment and improve efficiency of a remote query computer system, wherein the efficiency impediment is one or more of a dataflow bottleneck, excessive use of processor resources, or excessive use of RAM.

The operations can also include configuring a query update interval. The operations can further include executing a query update within the query update interval. The operations can include generating a set of query update data. The operation can also include collecting the set of query update data. The operations can further include writing the set of query update data to a third set of data systems for subsequent retrieval and analysis.

The operations can include configuring a query update interval. The operations can also include executing a query update. The operations can include determining that the query update may not complete within the query update interval. The operations can also include extending the query update interval to allow a full execution of the query update. The operations can further include generating a set of query update data. The operations can include collecting the set of query update data. The operations can also include writing the set of query update data to a third set of data systems.

The operations can include wherein the query task data includes an initial data from one or more nodes of an update propagation graph.

The operations can include where the query task includes at least one of an instance of a class implementing a remote query interface; a remote method invocation on a table handle object; and a script or line of scripting code to be evaluated by an interpreter on a remote query processor.

The operations can include wherein generating a set of query update data includes listening for an update to one or more dynamic nodes of an update propagation graph, determining an occurrence of an update to one or more nodes of the update propagation graph, and creating data for each occurrence of an update to one or more nodes of the update propagation graph.

BRIEF DESCRIPTION OF THE DRAWINGS

FIG. 8 is a diagram of an example of a top-level query log in accordance with some implementations.

FIG. 9 is a diagram of an example of a query operation log in accordance with some implementations.

FIG. 9A is a diagram of an example of an update log in accordance with some implementations.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
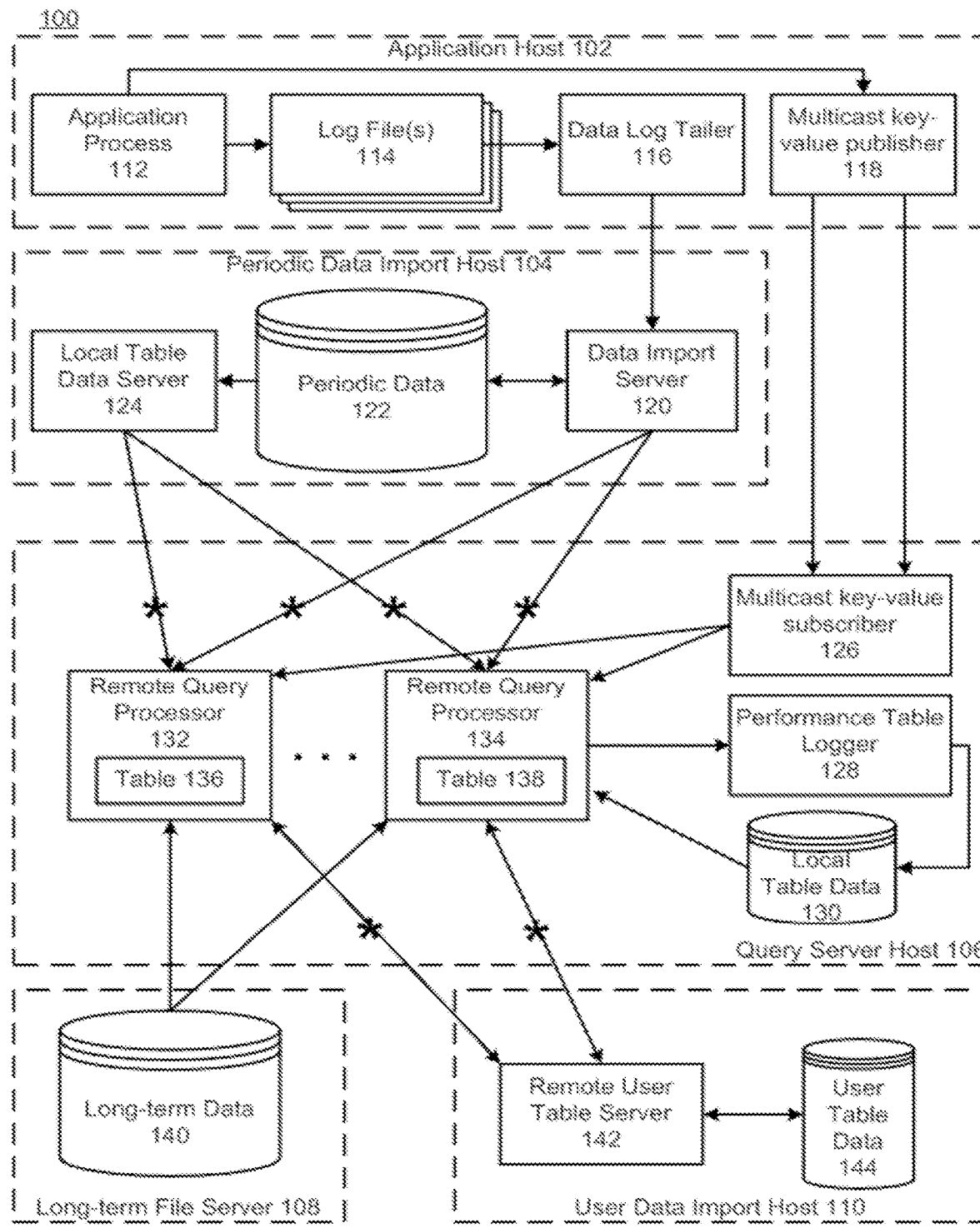
FIG. 1 is a diagram of an example computer data system showing an example data distribution configuration in accordance with some implementations.
Figure 2:
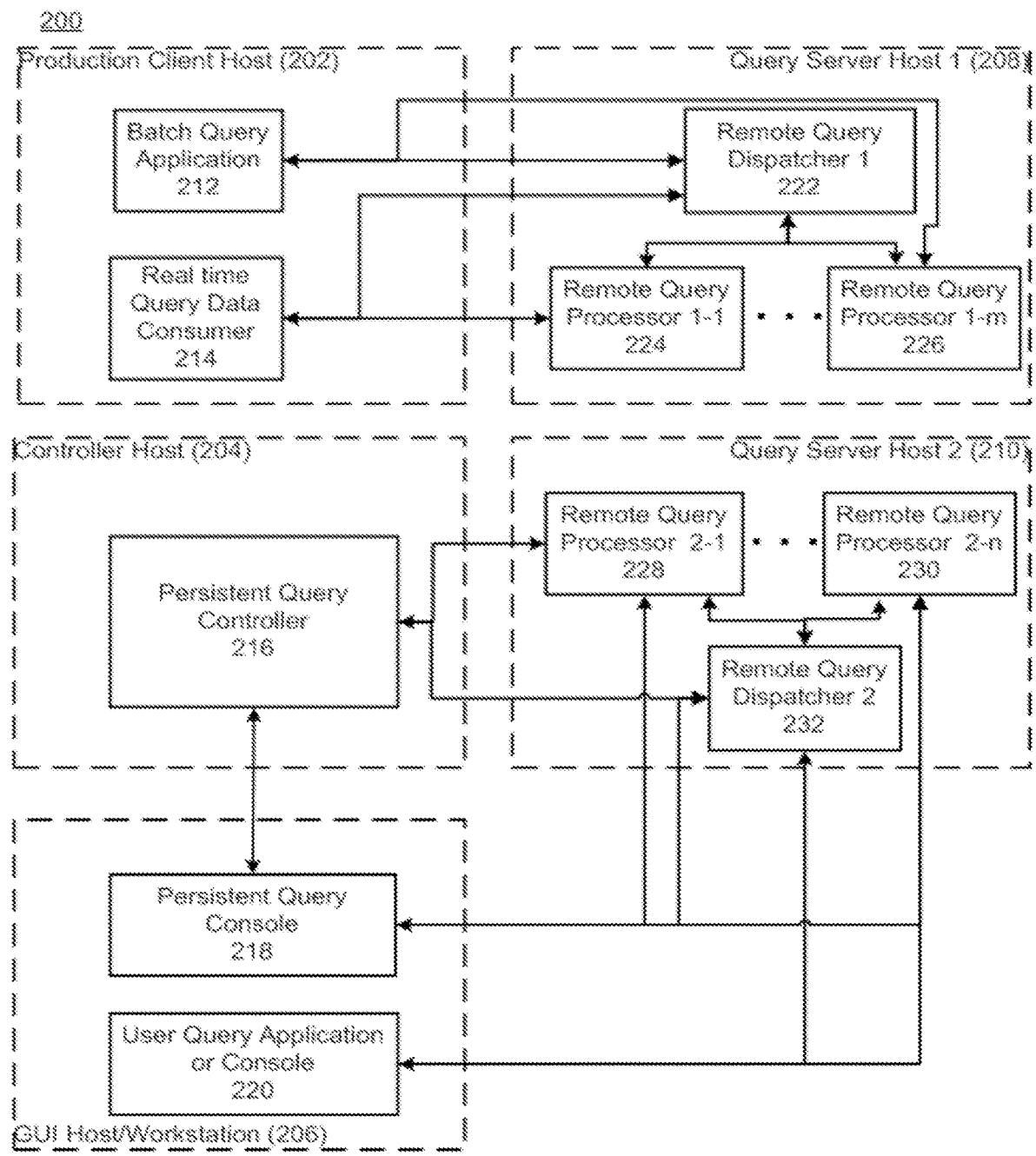
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( )statement execution, for example. A TableMap object can be the result of a byExternal( )statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market open, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
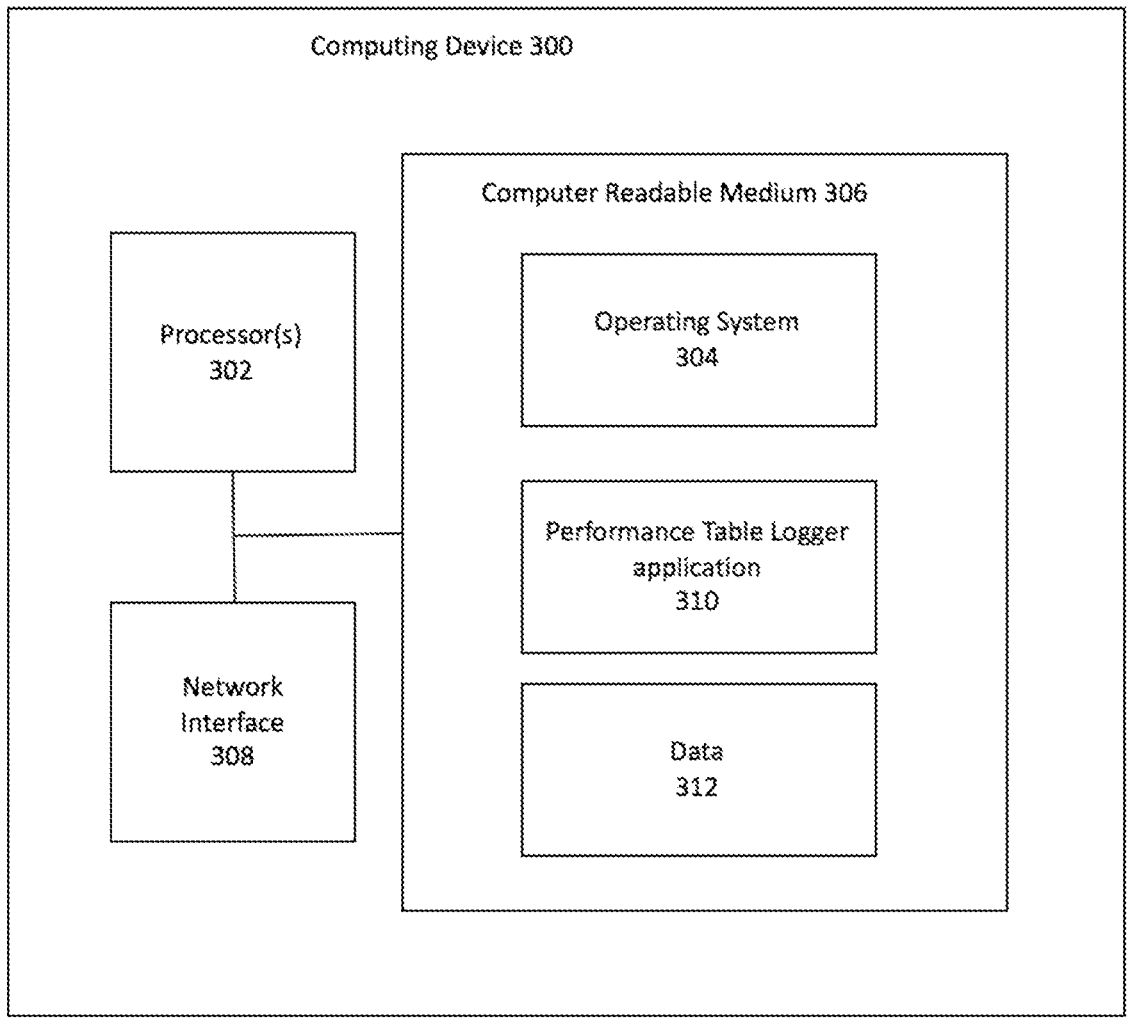
FIG. 3 is a diagram of an example computing device configured for performance data processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include performance table logger application 310 and a data section 312 (e.g., for storing ASTs, precompiled code, etc.).

In operation, the processor 302 may execute the application 310 stored in the memory 306. The application 310 can include software instructions that, when executed by the processor, cause the processor to perform operations for performance logging of complex query operations in accordance with the present disclosure (e.g., performing one or more of 1002-1018 described below).

The application program 310 can operate in conjunction with the data section 312 and the operating system 304.

Figure 4:
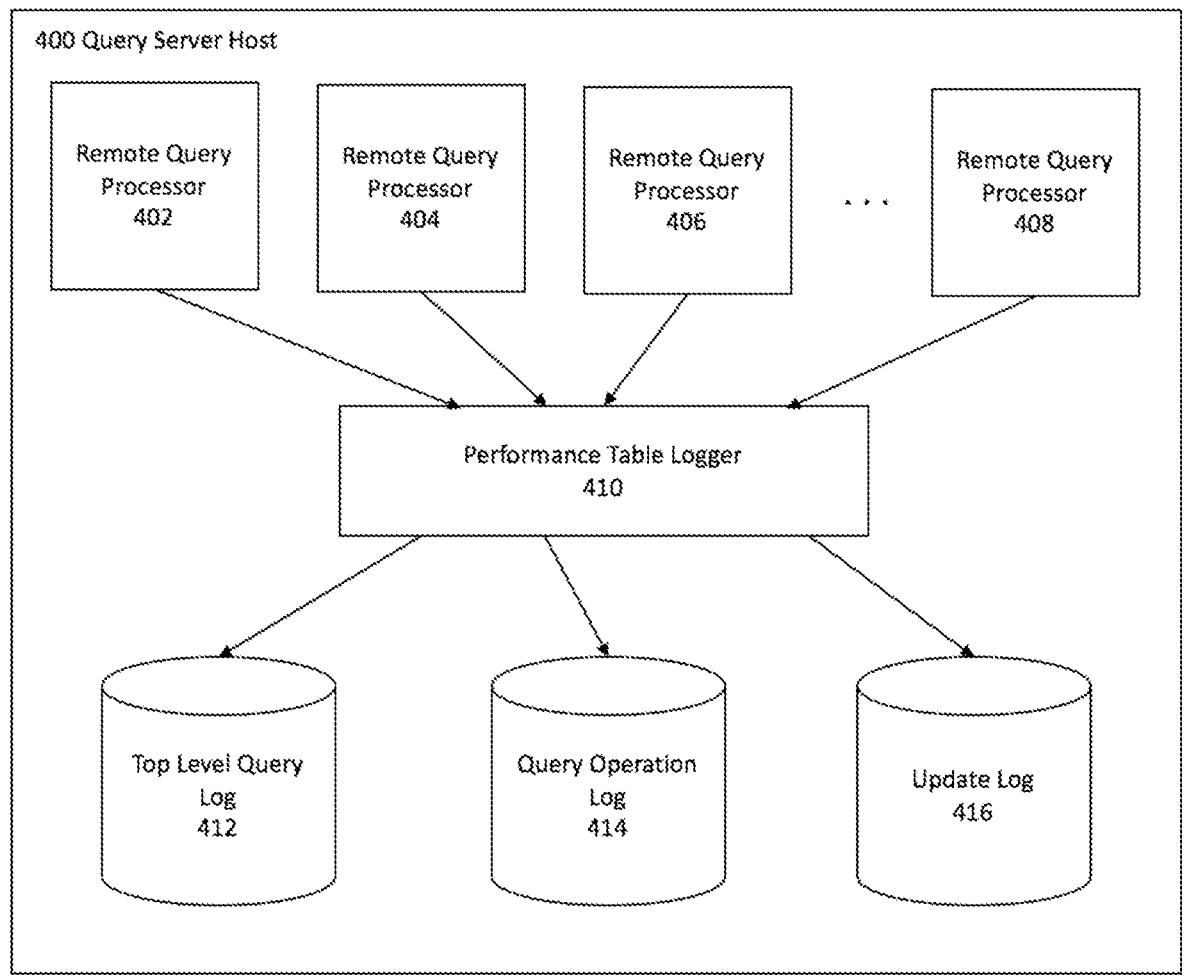
FIG. 4 is a diagram of an example query server host architecture in accordance with some implementations.

FIG. 4 is a diagram of an example query server host architecture 400 in accordance with some implementations. The query server host architecture 400 may include one or more remote query processors (402, 404, 406, 408), one or more performance table loggers 410, and one or more logs (412, 414, 416). The remote query processors (402, 404, 406, 408) can be connected to one or more performance table loggers 410. The one or more performance table loggers 410 can be responsible for one or more logs (412, 414, 416). The remote query processors (402, 404, 406, 408), the one or more performance table loggers 410, and one or more logs (412, 414, 416) can reside on a single computer system or can be distributed across different computer systems or servers.

The one or more remote query processors (402, 404, 406, 408) can monitor detailed real-time information during individual query processing. The remote query processors (402, 404, 406, 408) can forward the detailed query information to the performance table logger for storing in one or more logs. The remote query process is further described below in FIG. 4A.

It will be appreciated that logs can be a file, any set of data systems, or the like.

The one or more performance table loggers 410 can receive connections from to the one or more remote query processors (402, 404, 406, 408) and receive detailed real-time query information. The performance table logger 410 can format the received detailed real-time query information and can make a determination as to where, when, and how the formatted information should be stored. The performance table logger 410 is further described below in FIGS. 6A, 7, 7A, and 7B.

The top-level query log 412 can contain one or more entries for each query task. A query task can be submitted as (a) an instance of a class implementing a remote query interface; (b) a remote method invocation on a table handle object; or (c) a script or line of scripting code to be evaluated by an interpreter on the remote query processors (402, 404, 406, 408). The top-level query log 412 is further described below in FIG. 8.

The query operation log 414 can contain one or more entries for each instrumented sub-task of a query task and can be logged in order of the sub-task completion. The query operation log 414 is further described below in FIG. 9.

The update log 416 can contain one or more entries for each set of query sub-tasks that require update propagation. The update propagation can occur during an interval or at the end of a refresh cycle in order to record performance of the update propagation. The interval can be configurable. If an update propagation refresh cycle has not completed within the configured interval duration, the interval duration can be extended to reach the end of the update propagation refresh cycle. The update log 416 is further described below in FIG. 9A.

It will be appreciated that the query server host architecture 400 is a simplified configuration for purposes of illustrating the principles of the disclosed subject matter. An actual implementation may include one or more remote query processors, one or more performance table loggers and one or more log types.

Figure 4A:
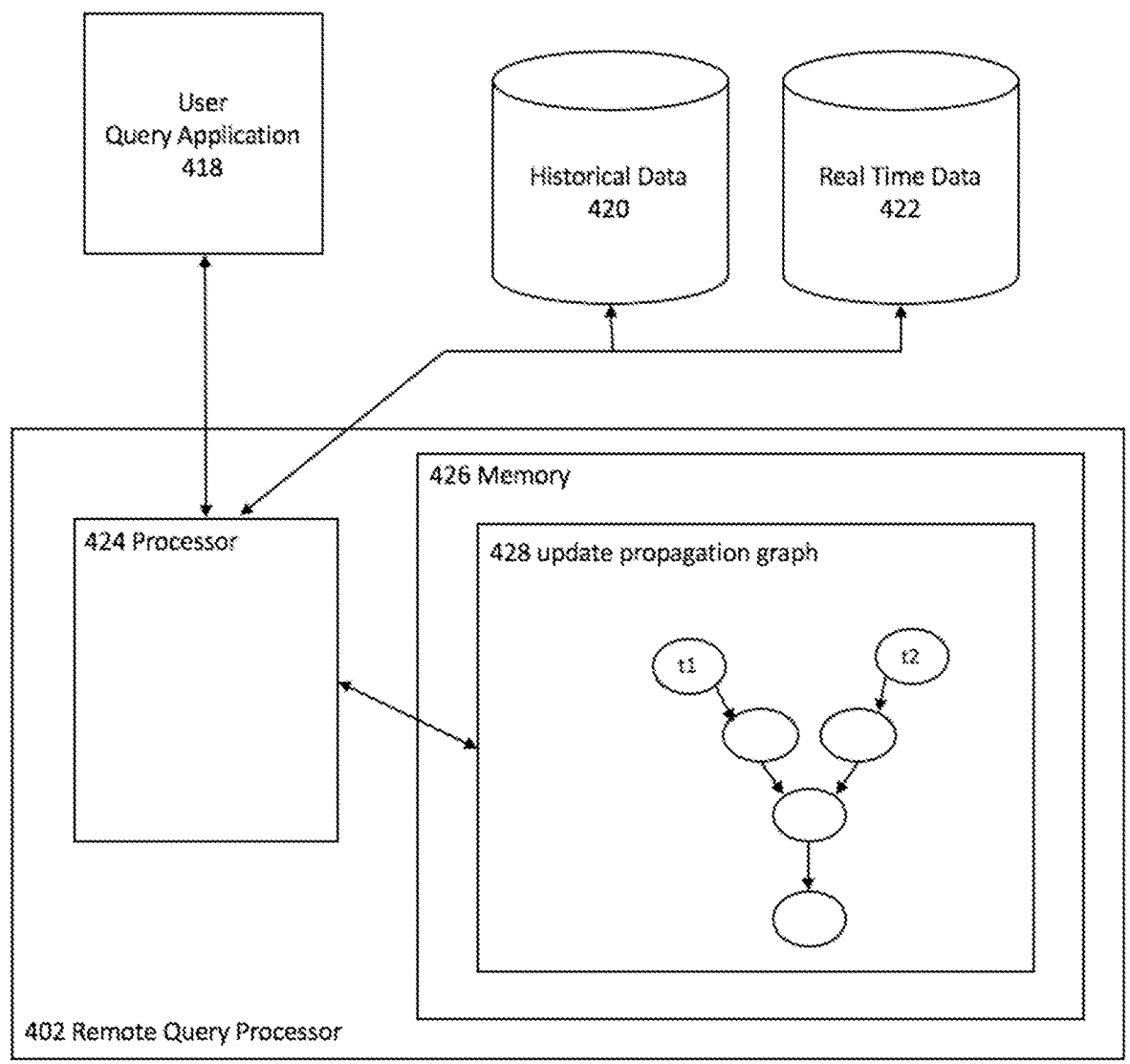
FIG. 4A is a diagram of an example remote query processor in accordance with some implementations.

FIG. 4A is a diagram of an example remote query processor 402 in accordance with some implementations. A remote query processor 402 can be connected to a user query application 418, a historical data store 420, and a real-time data store 422. The remote query processor 402, the user query application 418, the historical data store 420, and the real-time data store 422 can reside on a single computer system or can be distributed across different computer systems or servers.

The user query application 418 can submit jobs to the remote query processor 402. A job can contain a series of one or more query tasks. Query tasks can be instructions such as code in human-readable form, bytecode, references to stored procedures, or the like. Query tasks can be submitted as a language construct. For example the language construct can include (a) an instance of a class implementing a remote query interface; (b) a remote method invocation on a table handle object; (c) a script or line of scripting code to be evaluated by an interpreter on the remote query processor 402, or (d) similar language constructs.

The remote query processor 402 can receive jobs that can contain query tasks from the user query application 418. The remote query process 402 can examine the query task to determine the structure of the query task and the required data sources. The remote query process can execute query tasks and can build an update propagation graph 428 in the remote query process memory 426 to represent the outcome of the executed query task.

The update propagation graph 428 can be a structure that can be implemented with connected static and dynamic nodes. For example, the source nodes (t1, t2) can be tables derived from a raw data source. The children of the source nodes (t1, t2) can represent certain operations on the sources nodes (t1, t2) such as filtering by where clauses, grouping by clauses, average by clauses, joins, etc. An example makeup of an update propagation graph is explained in further detail in FIG. 5 below.

The historical data 420 can contain aged real-time data or any other data required by query tasks.

The real-time data 422 can contain data collected over an application-appropriate period of time, dynamically updated as new data becomes available.

Figure 5:
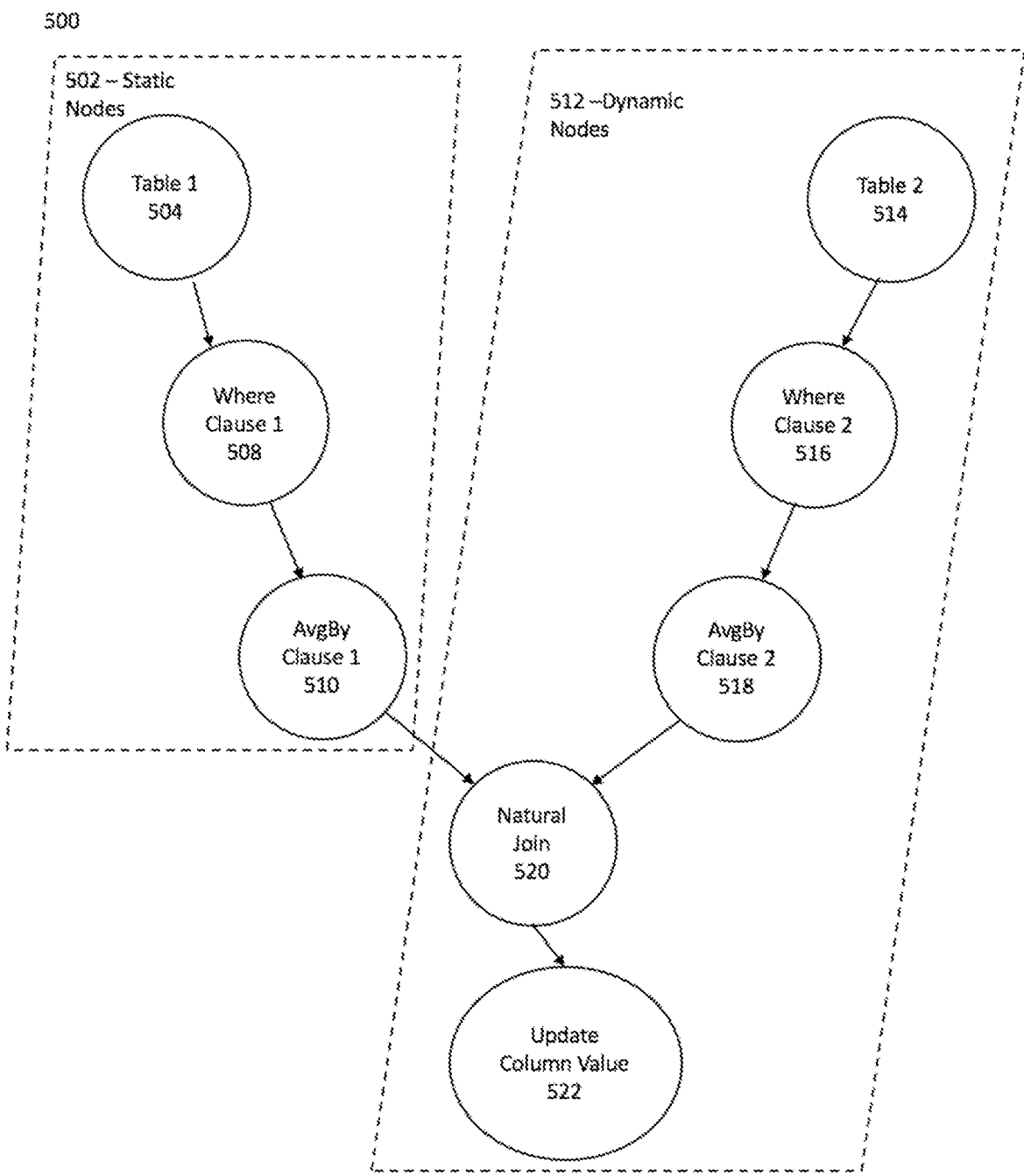
FIG. 5 is a diagram of example static and dynamic query nodes in accordance with some implementations.

FIG. 5 is a diagram of an example of static and dynamic table nodes 500 of an update propagation graph in accordance with some implementations. Some of the table nodes can be static nodes 502. Static nodes 502 can be nodes that contain data that does not change. For example, a static node can represent a source table that does not change. Some of the table nodes can be dynamic nodes 512. Dynamic nodes 512 can be nodes that can contain changing table data. For example, a dynamic node can be a table that permits changes through row additions, row deletions, row data modification, or re-indexing of rows. The static nodes 502 are an example of a static table 1 504 that is filtered by a where clause 1 508 that is subsequently aggregated by an avgby clause 1 510. The dynamic nodes 512 are an example of a dynamic table 2 514 that can be filtered by a where clause 2 516 that can subsequently be aggregated by an avgby clause 2 518. In the same example, the dynamic natural join 520 can be performed on avgby clause 1 510 and avgby clause 2 518, in which avgby clause 1 510 can be formed from table 1 504 via a where and avgby, and avgby clause 2 518 can be formed from table 2 514 via a where and an avgby.

The results (not shown) would be returned to the user query application 418. The refreshing of dynamic nodes 512 is described below in FIGS. 6, 7, 7A, and 7B.

Figure 6:
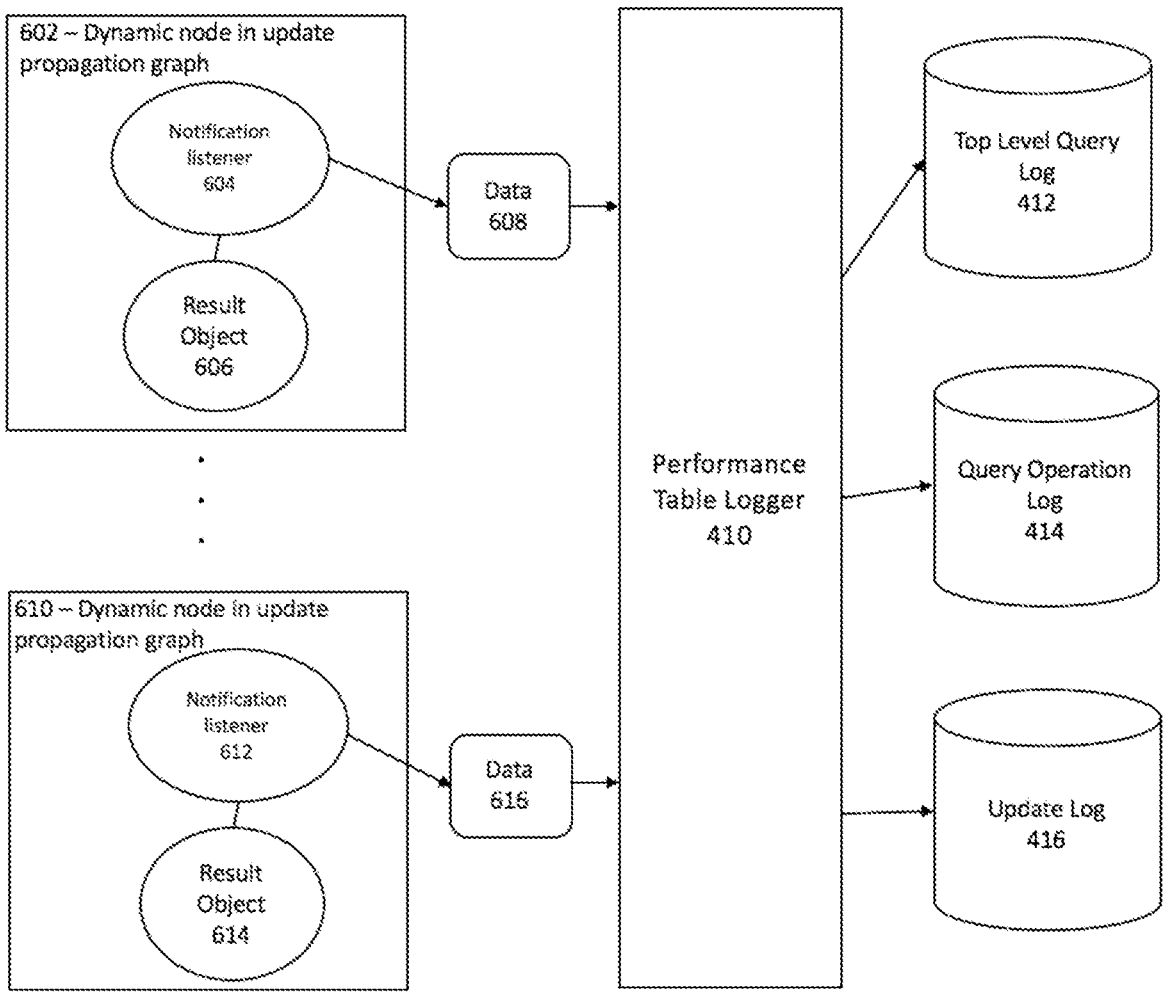
FIG. 6 is a diagram of example dynamic and static node data collection sequence in accordance with some implementations.

FIG. 6 is an example dynamic and static node data collection sequence 600 in accordance with some implementations. Static or dynamic node 602 and static or dynamic node 610 can be nodes from an update propagation graph as explained in FIG. 5 above. Each static or dynamic node 602, 610 can include a result object 606, 614, and a notification listener 604, 612. Data 608, 616 collected from the notification listener 604, 612 can be forwarded to the performance table logger 410 for formatting and assembling into a log entry. The performance logger 410 can log the entries as rows into the top-level log 412, query operation log 414, or the update log 416. Top-level log 412 and query operation log 414 can be updated as static/initially-available data is processed.

It will be appreciated that as updates are propagated according to an update propagation graph, notification listeners can channel the propagation of updates through an update propagation graph.

It will be appreciated that rows in the top-level log 412 and query operation log 414 are not necessarily associated 1 to 1 with notification listeners in an update propagation graph. In contrast, an update log 416 can receive data delivered as notifications from notification listeners. Notification listeners can send notifications to the performance logger 410 as the notification listeners are traversed in the update propagation graph. It will also be appreciated that static nodes in an update propagation graph may not contain notification listeners.

The notification listener 604, 612 can be a software construct associated with a dynamic node 602, 610 that listens for events or changes regarding its associated node's result object 606, 614. Update performance for dynamic nodes can be captured by notification listeners 604, 612 and then batched up for eventual propagation to an update performance logger. Events for static nodes can include a query operation and/or sub-operation that can create a static node or an initialization of a static node. Events or changes for dynamic nodes can include a query operation and/or sub-operation that can create a dynamic node, an initialization of a dynamic node, an addition to dynamic node content, a modification of dynamic node content, a deletion of dynamic node content, or a re-indexing of dynamic node content. When a notification listener 604, 612 observes an event or change to a dynamic node 602, 610, the notification listener 604, 612 can collect data 608, 616 about the change and forward the data 608, 616 to the performance table logger 410 that can then be logged into the update log 416.

Figure 7:
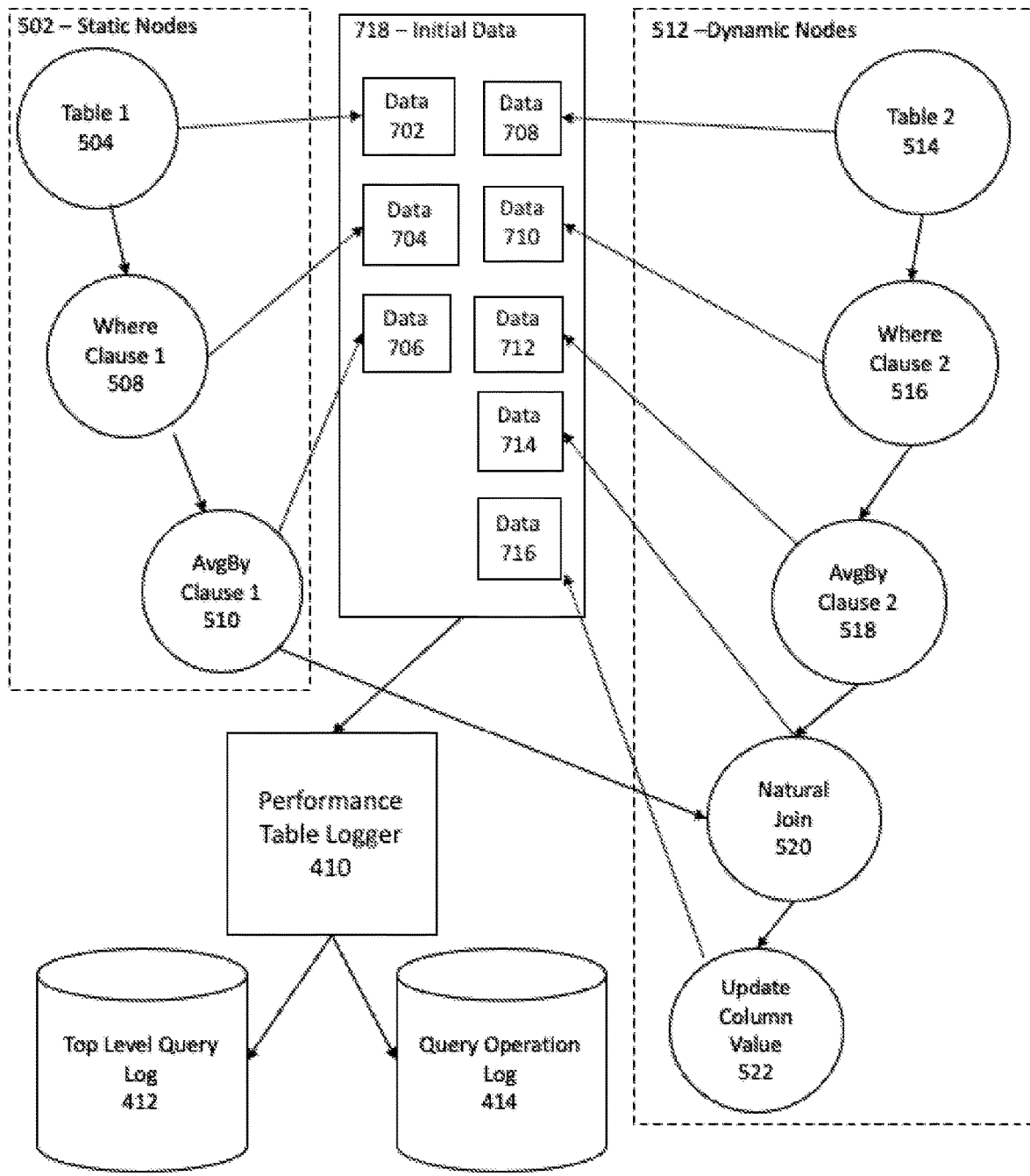
FIG. 7 is a diagram of an example collection of performance data for the initial execution of a query in accordance with some implementations.

FIG. 7 is an example of a generation and collection of performance data for an initial execution of a query 700. The initial execution of an example query task that can be received by the remote query processor 402 from the user query application. The example query task can join two tables using filtering clauses. The query task can cause the remote query processor 402 to create an update propagation graph 428 in memory 426 that can be represented by static nodes 502 and dynamic nodes 512. The initial data 718 can be collected as an initial set of data and forwarded to the performance table logger 410 for logging into the top-level query log 412 and query operation log 414. It will be appreciated that the initial data 718 can be forwarded to the performance table logger 410 as individual data (702-716) and can then be combined into initial data 718 by the performance table logger 410 or the data (702-716) can be assembled into the initial data 718 before forwarding the initial data 718 to the performance table logger 410. It will also be appreciated that if a query is executed in multiple parts during a command line session, there may be "initial" data created during each command line execution as the new part of the query initializes.

It will be appreciated that a query execution, which can set up static nodes and dynamic nodes (often identical to static nodes except for extra coding to enable listener setup) in an update propagation graph, can gather top-level and query operation performance data. Each part of the query's operation code can be enclosed within an entry of performance data (702-716). The entry of performance data (702-716) can be started and registered with a performance monitoring framework at the beginning of a query operation code block. The entry of performance data (702-716) can be closed at the end of the query execution and/or aborted as a side-effect of early termination of the query execution in the event of a thrown and caught exception event.

It will also be appreciated that performance data entries for query operations can be invoked by other higher-level operations, and thus have their life-cycles enclosed within the higher-level operation's entries, and can have an associated log table row appear before an enclosing operation's rows.

Figure 7A:
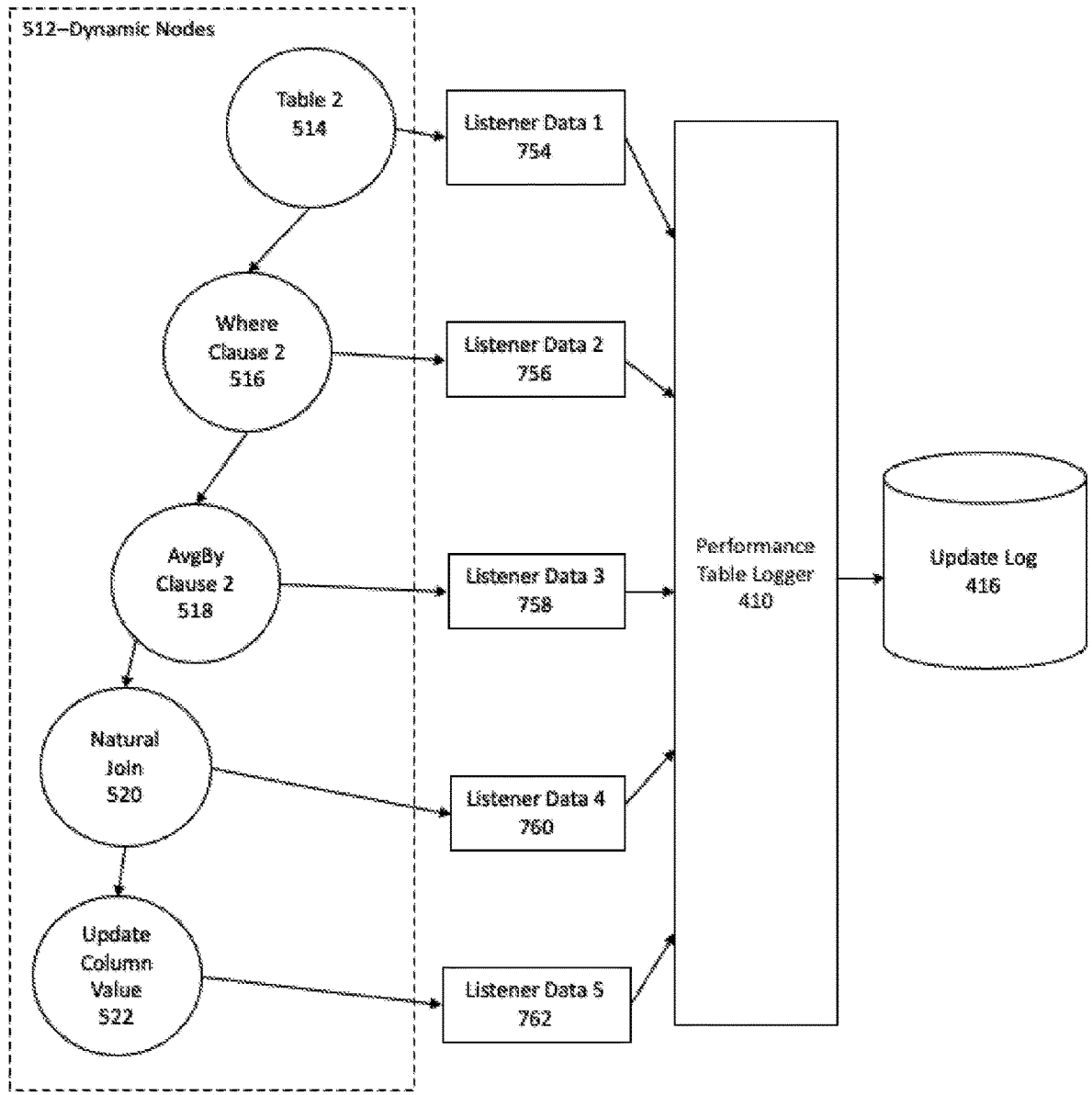
FIG. 7A is a diagram of an example collection of performance data for the dynamic execution of a query in accordance with some implementations.

FIG. 7A is an example of generation and collection of performance data for the dynamic execution of a query 750 in accordance with some implementations. In this example, it is assumed that the update propagation graph has already been created by the execution of a query task and initial data 718 has already been generated, collected, and forwarded to the performance table logger 410 and logged into top-level query log 412 and query operation log 414. The example demonstrates the dynamic nodes 512 from FIG. 5 and the performance table logger 410 and update log 416 from FIG. 4. The dynamic nodes (514, 516, 518, 520, 522) can each contain a result object (606, 614) and an notification listener (e.g., 604, 612). Each notification listener (604, 612) can create listener data (754, 756, 758, 760, 762) for forwarding to the performance table logger 410 to be logged in the update log 416. This process is further described below in FIG. 10.

The listener data (754, 756, 758, 760, 762) can contain information related to the update of its associated node. For example, listener data 1 754 can contain information about the most recent update to node 514; listener data 2 756 can contain information about the most recent update to node 516; listener data 3 758 can contain information about the most recent update to node 518; listener data 4 760 can contain information about the most recent update to node 520; and listener data 5 762 can contain information about the most recent update to node 522. The update to each node can be initiated with an add, modify, delete, re-index, or other type message received from the parent node. Because the updates to the nodes can propagate from node 514 through node 522, the listener data can be collected first at listener data 1 754, followed by the collection at listener data 2, 756, and so forth to listener data 5 762.

It will be appreciated that a set of changes (e.g. add, modify, delete, re-index, or other type message) can be reported to a notification listener in an individual message or in single messages for update propagation. Other type messages can include messages for changes to non-tabular data.

It will be appreciated that listener data 1 754, listener data 2 756, listener data 3 758, listener data 4 760, or listener data 5 762 can be collected in a buffer before being forwarded to the performance table logger 410 in a single communication or each listener data (754, 746, 758, 760, 762) can be forwarded separately to the performance table logger 410 as it occurs.

Figure 7B:
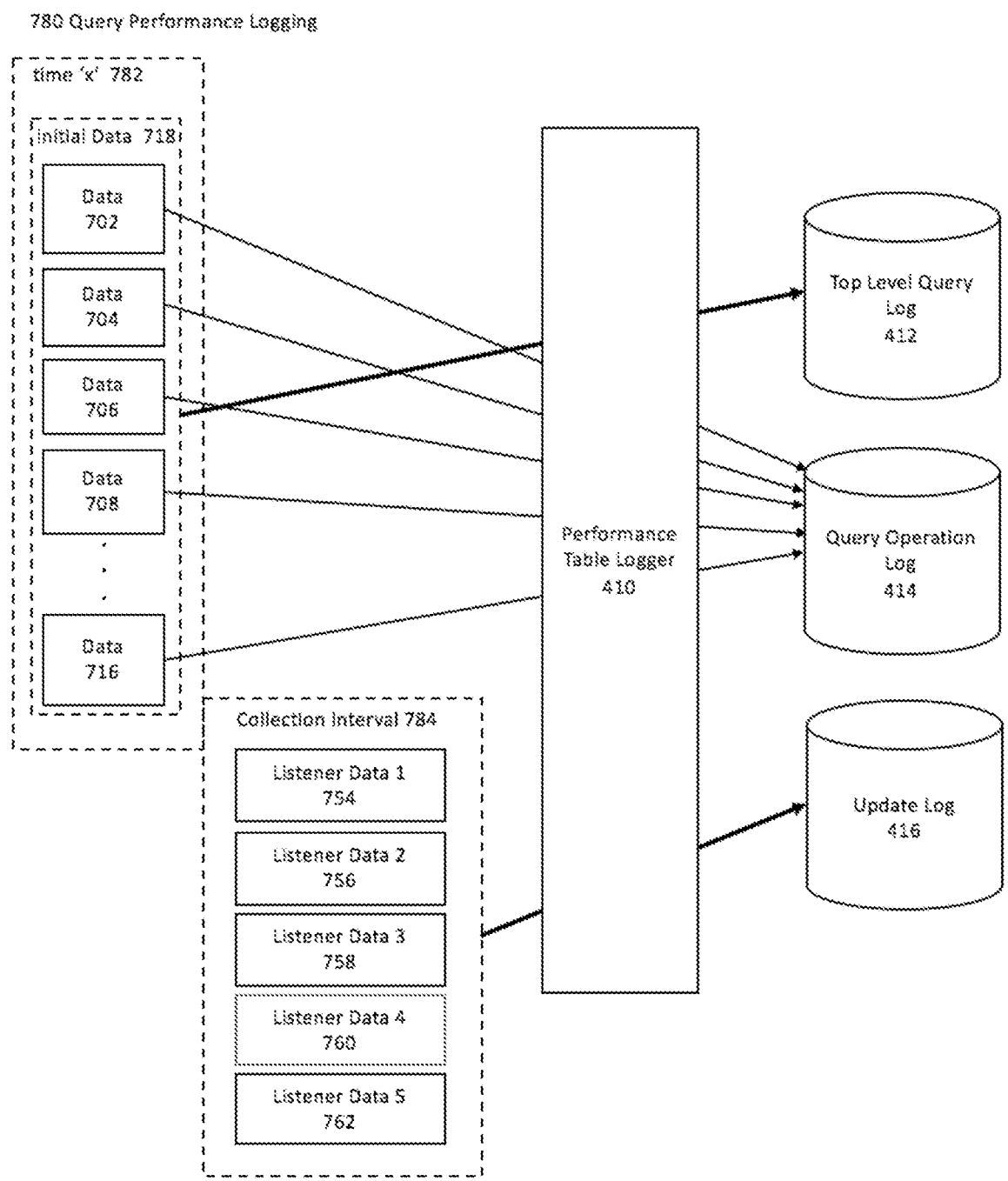
FIG. 7B is a diagram of an example of three different types of query performance logging in accordance with some implementations.

FIG. 7B is a diagram of an example of the relationship between three different types of query performance logging 780 in accordance with some implementations. The top level query log 412 can receive initial data 718 collected from an initial query via the performance table logger 410. The query operation log 414 can receive initial subtask data 718 via the performance table logger 410. The update log 416 can receive listener data from dynamic nodes via the performance table logger 410. Time 'x' 782 can be marked as the time the query was initially executed. The collection interval 784 can be the time elapsed since the initial query time or the time elapsed since the last update.

FIG. 8 is a diagram of an example of a top-level query log 800 in accordance with some implementations. A top-level query log 412 can collect for each query task one or more rows of data that can describe the performance of an entire query. An example of a subset of query data collected in the top-level query log can be an execution date 802, a query ID 804, a query start time 808, a query end time 810, and the query initial execution duration 814. An example of other query data collected in the top-level query log can be a query dispatcher name, a query processing host name, a query submitting client host name, a query request ID, a query request description, a remote query processor name, a remote query processor ID, a query class name, a query client name, a query job submission name, a query number, a time out, a request heap size, a remote query processor heap size, extra Java Virtual Machine arguments, class path additions, total free memory, a total memory used, free memory change, total memory change, number first time data reads, number of repeated data reads, average first time data read time, average repeated data read time, interruptions, result class name, result size, whether replayed data used, exceptions, query instance, and pushed classes.

It will be appreciated that any data that is collectable regarding the initial execution of a query or summary data thereof can be a potential candidate for the top level query log. Additional log data can be added or removed by adjusting the log collection configuration. It will also be appreciated that log data can be calculated from collected data. For example, duration 814 can be calculated by subtracting the start time 808 from end time 810.

FIG. 9 is a diagram of an example of a query operation log 900 in accordance with some implementations. A query operation log can collect for each instrumented subtask of a query task one or more rows of data logged in order of subtask completion that can describe the performance of that query subtask. An example of a subset of query data collected in the query operation log can be a query ID 902, an operation number 904, a subtask description 906, an input size 908, and a subtask duration 910. An example of other query subtask data collected in the query operation log can be query subtask end time, subtask duration, subtask execution date, subtask query dispatcher name, subtask server host, subtask client host, subtask request ID, caller lines, whether top level, compilation status (e.g., marking subtasks that can correspond to a compilation of a query-language string into executable code), start time, free memory change, total memory change, number of first time data reads, number of repeated data reads, average first time data read time, average repeated data read time, interruptions.

It will be appreciated that any data that is collectable regarding the execution of a query subtasks can be a potential candidate for the query operation log. Additional log data can be added or removed by adjusting the log collection configuration. It will also be appreciated that log data can be calculated from collected data.

FIG. 9A is a diagram of an example of an update log 950 in accordance with some implementations. An update log can contain one or more rows for each node in the update propagation graph per interval or at the end of the update propagation graph refresh cycle in order to record performance of the notification listeners in propagating update propagation graph updates. The interval duration can be configurable. If the update propagation graph refresh cycle has not completed within the interval, the end of the update propagation graph refresh cycle can control the timing of the log entry.

An example update log row can contain an interval start time 952, an interval end time 954, an entry ID 956, an entry description 958, and execution time 960. An example of other update data collected in the update log can be ratio (e.g., ratio of an update time for a node to interval time), total memory free, total memory used, date, server host, dispatcher name, remote query processor name, remote query processor start time, client host, query name, entry caller line, entry interval usage, entry interval added, entry interval removed, entry interval modified, entry interval initial data reads, entry interval repeat data reads, entry interval average initial data read time, and entry interval average repeat data read time.

It will be appreciated that any data that is collectable regarding a query update can be a potential candidate for the update log. Additional log data can be added or removed by adjusting the log collection configuration. It will also be appreciated that log data can be calculated from collected data.

Figure 10:
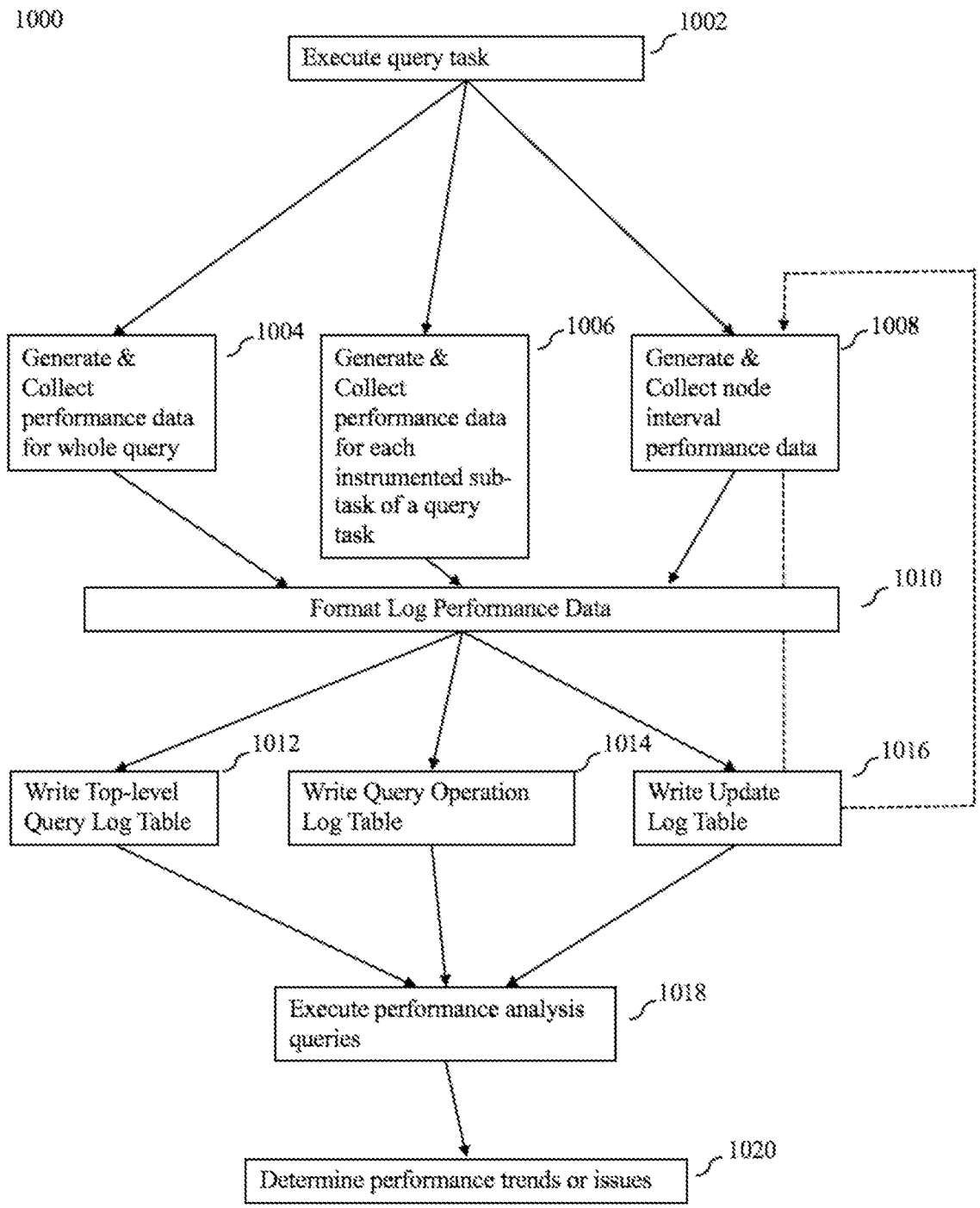
FIG. 10 is a flowchart showing an example method of operation for a performance data processing architecture in accordance with some implementations.

FIG. 10 is a flowchart showing an example method 1000 of method of operation for a performance data processing architecture in accordance with some implementations. Processing begins at 1002, when a query is executed. Processing continues to 1004, 1006, and 1008.

At 1004, an initial set of performance data is collected for the entirety of the query task.

At 1006, performance data is generated and collected for each instrumented subtask of a query task. It will be appreciated that two or more sets of data may be connected by a common query ID.

At 1008, performance data is generated and collected by the notification listener associated with the dynamic node for each dynamic node in the update propagation graph over an interval duration. An update log can contain one or more rows for each node in the update propagation graph per interval or at the end of the update propagation graph refresh cycle in order to record performance of the notification listeners in propagating update propagation graph updates. The interval duration can be configurable. The interval duration can also be extended if the entire update propagation graph update, also known as an update propagation graph refresh cycle, requires a longer duration than the configured duration.

At 1010, the performance data from steps 1004, 1006, and 1008 is received for processing by a performance table logger 410. If the data is the initial performance data for the query 1004, the performance table logger 410 formats the received initial query data 718 into one or more rows of data for the top-level query log 412. The collected subtask data 1006 is also formatted by the performance table logger 410 into one or more rows of data for each subtask of the entire query. If the collected data is node interval performance data 1008, the performance table logger 410 formats the received interval performance data 1008 into one or more rows of data for each updated update propagation graph node.

It will be appreciated that data can be received by the performance table logger 410 as individual data packets or as an array or array equivalent of data packets, and that data of each type (top-level, sub-task, and update) may be received as part of the same logical message.

At 1012, the formatted performance data for the entire query is written to the top-query log table.

At 1014, the formatted data that was collected for each instrumented subtask of a query is written to the query operation log table.

At 1016, the formatted data that was collected for each dynamic update propagation graph node during an interval duration or an update propagation graph refresh cycle is written to the update log table.

It will be appreciated that formatted data written to the top-query log table, query operation log table and update log table can be written to a buffer before writing to the tables. It will also be appreciated that the size of the log tables can be managed by archiving older log table rows.

At 1018, the data collected in the top-level query log table, the query operation log table, and the update log table is analyzed for insight into the performance of queries.

At 1020, the performance analysis can be used to determine query performance or query system issues.

It will be appreciated that performance analysis of query data can be useful in determining input/output bottleneck trends, peak time-of-day sizing requirement, inefficient query algorithms, users who would benefit from training in formulating queries, which code users are actually using, major areas where the system need performance tuning, and the like.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for collection and processing of query performance data.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system for improving performance of a remote query computer system by using dynamic query performance logging to identify and remediate efficiency impediments in the remote query computer system, the system comprising:
   one or more processors;
   computer readable storage coupled to the one or more processors, the computer readable storage having stored thereon instructions that, when executed by the one or more processors, cause the one or more processors to perform operations including:
   receiving, at a query server computer, a digital request from a client computer to execute a query task;
   executing the query task;
   generating query task data using an update propagation graph, the update propagation graph being a structure implemented with connected nodes through which data is propagated to determine an output of the query task, each of the connected nodes being a static node or a dynamic node;
   storing the query task data for subsequent retrieval and analysis;
   executing a query update, the query task comprising a recurring query operation, the executing the query update comprising updating one or more dynamic components of the recurring query operation;
   configuring a query update interval;
   generating query update data for the update interval, the generating the query update data including:
      starting a refresh cycle during which one or more changes are propagated through the update propagation graph to determine an updated output of the query task based on the one or more changes;
      listening, for each node of one or more dynamic nodes of the update propagation graph, at a listener associated with the node for change messages from one or more parent nodes of the node;
      after starting the refresh cycle, receiving, at each of one or more listeners associated with nodes of the update propagation graph, one or more change messages at the listener from a parent node of the listener's associated node, updates being propagated node-to-node through the update propagation graph via the change messages,
      determining an occurrence of an update to one or more nodes of the update propagation graph,
      after the receiving the one or more change messages, ending the refresh cycle to indicate completion of propagation of the one or more changes through the update propagation graph and determine the updated output of the query task, and
      creating at least a portion of the query update data for the occurrence of the update to one or more nodes of the update propagation graph;
   determining that the query update may not complete within the query update interval;
   extending the query update interval to reach the end of the refresh cycle and allow full execution of the query update during the query update interval;
   storing the query update data for subsequent retrieval and analysis;
   retrieving the query task data and the query update data;
   using a performance-enhancing processor to analyze the retrieved query task data and the retrieved query update data to obtain an analysis result;
   with the performance-enhancing processor, identifying based on the analysis result an efficiency impediment in the query server computer; and
   responsive to the identifying, making changes to stored instructions and thereby alleviating the identified efficiency impediment and improving efficiency of the query server computer, wherein the efficiency impediment is one or more of: a dataflow bottleneck, excessive use of processor resources, or excessive use of RAM.

2. The system of claim 1, wherein the query task includes at least one member of the group consisting of:
    an instance of a class implementing a remote query interface;
    a remote method invocation on a table handle object; and
    a script or line of scripting code to be evaluated by an interpreter on a remote query processor.

3. The system of claim 1, wherein the query task data includes performance data.

4. A method comprising:
    receiving, at a query server computer, a digital request from a client computer to execute a query task;
    executing the query task;
    generating query task data using an update propagation graph, the update propagation graph being a structure implemented with connected nodes through which data is propagated to determine an output of the query task, each of the connected nodes being a static node or a dynamic node;
    storing the query task data for subsequent retrieval and analysis;
    executing a query update, the query task comprising a recurring query operation, the executing the query update comprising updating one or more dynamic components of the recurring query operation;
    configuring a query update interval;
        generating query task update data for the update interval, the generating the query task update data including:
            starting a refresh cycle during which one or more changes are propagated through the update propagation graph to determine an updated output of the query task based on the one or more changes,
            listening, for each node of one or more dynamic nodes of the update propagation graph, at a listener associated with the node for change messages from one or more parent nodes of the node,
            after starting the refresh cycle, receiving, at each of one or more listeners associated with nodes of the update propagation graph, one or more change messages at the listener from a parent node of the listener's associated node, updates being propagated node-to-node through the update propagation graph via the change messages,
            determining an occurrence of an update to one or more nodes of the update propagation graph,
        after the receiving the one or more change messages, ending the refresh cycle to indicate completion of propagation of the one or more changes through the update propagation graph and determine the updated output of the query task, and
            creating at least a portion of the query task update data for the occurrence of the update to one or more nodes of the update propagation graph;
    determining that the query update may not complete within the query update interval;
    extending the query update interval to reach the end of the refresh cycle and allow full execution of the query update during the query update interval;
    storing the query task update data for subsequent retrieval and analysis;
    retrieving the query task data and the query task update data;
    analyzing the retrieved query task data and the retrieved query task update data to obtain an analysis result;
    identifying based on the analysis result an efficiency impediment in the query server computer; and
    making changes to stored instructions and thereby alleviating the identified efficiency impediment and improving efficiency of the query server computer,
    wherein the efficiency impediment is one or more of: a dataflow bottleneck, excessive use of processor resources, or excessive use of RAM.

5. The method of claim 4, wherein the determining the occurrence of an update to one or more nodes of the update propagation graph is based on a determination of one or more events without requiring a comparison of data results.

6. The method of claim 4, wherein the query task includes at least one member of the group consisting of:
    an instance of a class implementing a remote query interface;
    a remote method invocation on a table handle object; and
    a script or line of scripting code to be evaluated by an interpreter on a remote query processor.

7. The method of claim 4, wherein the query task data includes performance data.

8. A nontransitory computer readable medium having stored thereon software instructions that, when executed by one or more processors, cause the one or more processors to perform operations including:
    receiving, at a query server computer, a digital request from a client computer to execute a query task;
    executing the query task;
    generating query task data using an update propagation graph, the update propagation graph being a structure implemented with connected nodes through which data is propagated to determine an output of the query task, each of the connected nodes being a static node or a dynamic node;
    storing the query task data for subsequent retrieval and analysis;
    executing a query update, the query task comprising a recurring query operation, the executing the query update comprising updating one or more dynamic components of the recurring query operation;
    configuring a query update interval;
    generating query task update data for the update interval, the generating the query task update data including:
        starting a refresh cycle during which one or more changes are propagated through the update propagation graph to determine an updated output of the query task based on the one or more changes,
        listening, for each node of one or more dynamic nodes of the update propagation graph, at a listener associated with the node for change messages from one or more parent nodes of the node,
        after starting the refresh cycle, receiving, at each of one or more listeners associated with nodes of the update propagation graph, one or more change messages at the listener from a parent node of the listener's associated node, updates being propagated node-to-node through the update propagation graph via the change messages,
        determining an occurrence of an update to one or more nodes of the update propagation graph,
        after the receiving the one or more change messages, ending the refresh cycle to indicate completion of propagation of the one or more changes through the update propagation graph and determine the updated output of the query task, and creating at least a portion of the query task update data for the occurrence of the update to one or more nodes of the update propagation graph;
determining that the query update may not complete within the query update interval;
extending the query update interval to reach the end of the refresh cycle and allow full execution of the query update during the query update interval;
storing the query task update data for subsequent retrieval and analysis;
retrieving the query task data and the query task update data;
analyzing the retrieved query task data and the retrieved query task update data to obtain an analysis result;
identifying based on the analysis result an efficiency impediment in the query server computer; and
making changes to stored instructions and thereby alleviating the identified efficiency impediment and improving efficiency of the query server computer,
wherein the efficiency impediment is one or more of: a dataflow bottleneck, excessive use of processor resources, or excessive use of RAM.

9. The nontransitory computer readable medium of claim 8, wherein the determining the occurrence of an update to one or more nodes of the update propagation graph is based on a determination of one or more events without requiring a comparison of data results.

10. The nontransitory computer readable medium of claim 8, wherein the query task data includes performance data.

11. The nontransitory computer readable medium of claim 8, wherein the query task includes at least one member of the group consisting of:
an instance of a class implementing a remote query interface;
a remote method invocation on a table handle object; and
a script or line of scripting code to be evaluated by an interpreter on a remote query processor.

12. A system for improving performance of a remote query computer system by using dynamic query performance logging to identify and remediate efficiency impediments in the remote query computer system, the system comprising:
one or more processors;
computer readable storage coupled to the one or more processors, the computer readable storage having stored thereon instructions that, when executed by the one or more processors, cause the one or more processors to perform operations including:
receiving, at a query server computer, a digital request from a client computer to execute a query task;
executing the query task;
generating query task data using an update propagation graph, the update propagation graph being a structure implemented with connected nodes through which data is propagated to determine an output of the query task, each of the connected nodes being a static node or a dynamic node;
storing the query task data for subsequent retrieval and analysis;
executing a query update, the query task comprising a recurring query operation, the executing the query update comprising updating one or more dynamic components of the recurring query operation;
configuring a query update interval;
generating query update data for the update interval, the generating the query update data including:
starting a refresh cycle during which one or more changes are propagated through the update propagation graph to determine an updated output of the query task based on the one or more changes,
listening, for each node of one or more dynamic nodes of the update propagation graph, at a listener associated with the node for change messages from one or more parent nodes of the node,
after starting the refresh cycle, receiving, at each of one or more listeners associated with nodes of the update propagation graph, one or more change messages at the listener from a parent node of the listener's associated node, updates being propagated node-to-node through the update propagation graph via the change messages,
determining an occurrence of an update to one or more nodes of the update propagation graph,
after the receiving the one or more change messages, ending the refresh cycle to indicate completion of propagation of the one or more changes through the update propagation graph and determine the updated output of the query task, and
creating at least a portion of the query update data for the occurrence of the update to one or more nodes of the update propagation graph;
determining that the query update may not complete within the query update interval;
extending the query update interval to reach the end of the refresh cycle and allow full execution of the query update during the query update interval;
storing the query update data for subsequent retrieval and analysis;
retrieving the query task data and the query update data;
analyzing the retrieved query task data and the retrieved query update data to obtain an analysis result;
identifying based on the analysis result an efficiency impediment in the query server computer; and
making changes to stored software instructions and thereby alleviating the identified efficiency impediment and improving efficiency of the query server computer,
wherein the efficiency impediment is one or more of: a dataflow bottleneck, excessive use of processor resources, or excessive use of RAM.

13. The system of claim 12, wherein the determining the occurrence of an update to one or more nodes of the update propagation graph is based on a determination of one or more events without requiring a comparison of data results.

* * * * *